United States Patent
Green et al.

(10) Patent No.: US 10,620,817 B2
(45) Date of Patent: Apr. 14, 2020

(54) PROVIDING AUGMENTED REALITY LINKS TO STORED FILES

(71) Applicant: INTERNATIONAL BUSINESS MACHINES CORPORATION, Armonk, NY (US)

(72) Inventors: Sophie D. Green, Hursley (GB); Grace Jansen, Southampton (GB); Antony Protonotarios, Chichester (GB); James Russell, Chertsey (GB); Alexandros Elio Vlissidis, Bath (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 15/406,219

(22) Filed: Jan. 13, 2017

(65) Prior Publication Data

US 2018/0203579 A1     Jul. 19, 2018

(51) Int. Cl.
| | |
|---|---|
| *G06F 3/048* | (2013.01) |
| *G06F 16/16* | (2019.01) |
| *G06F 3/0486* | (2013.01) |
| *G06F 3/01* | (2006.01) |
| *G06K 9/00* | (2006.01) |

(Continued)

(52) U.S. Cl.
CPC ............ *G06F 3/0486* (2013.01); *G06F 3/011* (2013.01); *G06F 3/017* (2013.01); *G06F 3/04842* (2013.01); *G06F 16/13* (2019.01); *G06F 16/168* (2019.01); *G06K 9/00671* (2013.01); *G06F 3/04817* (2013.01)

(58) Field of Classification Search
CPC .... G06F 17/30091; G06F 3/017; G06F 3/012; G06F 3/04817
See application file for complete search history.

(56) References Cited

U.S. PATENT DOCUMENTS

| | | | |
|---|---|---|---|
| 9,274,340 B2 | 3/2016 | Lyons | |
| 9,454,251 B1* | 9/2016 | Guihot | G06F 3/041 |

(Continued)

FOREIGN PATENT DOCUMENTS

| | | |
|---|---|---|
| EP | 2767845 A1 | 8/2014 |
| WO | WO2014197387 A1 | 12/2014 |
| WO | WO2016048658 A1 | 3/2016 |

OTHER PUBLICATIONS

Lin et al., "Ubii: Physical World Interaction Through Augmented Reality", IEEE, May 2016. (pp. 1-14).

*Primary Examiner* — Scott T Baderman
*Assistant Examiner* — Mario M Velez-Lopez
(74) *Attorney, Agent, or Firm* — William A. Kinnaman, Esq.; Kevin P. Radigan, Esq.; Heslin Rothenberg Farley & Mesiti P.C.

(57) ABSTRACT

Augmented reality links to stored files. A marker of a real object or a real location as viewed by an augmented reality (AR) device of a computer system is stored, in which the marker is stored in a database with a link to a location of a file or a folder in a file system of the connectable computer system. Saving and retrieval of a file or a folder to and from the connectable computer system are enabled by user selection of the real object or the real location via user interaction with the AR device thereby detecting the marker and activating the link to the computer system to save a file or a folder to the location or to retrieve a file or a folder from the location.

19 Claims, 7 Drawing Sheets

(51) Int. Cl.
    *G06F 3/0484*     (2013.01)
    *G06F 16/13*     (2019.01)
    *G06F 3/0481*     (2013.01)

(56) References Cited

U.S. PATENT DOCUMENTS

| | | | |
|---|---|---|---|
| 9,871,774 B1* | 1/2018 | Liu | H04L 63/0435 |
| 9,911,231 B2* | 3/2018 | Subramanian | G06T 19/006 |
| 2008/0215524 A1* | 9/2008 | Fuchs | G06F 17/30241 |
| 2009/0292464 A1* | 11/2009 | Fuchs | G06Q 10/087 |
| | | | 701/532 |
| 2013/0328770 A1* | 12/2013 | Parham | G06F 3/0304 |
| | | | 345/157 |
| 2015/0062629 A1* | 3/2015 | Tamura | H04N 1/00307 |
| | | | 358/1.15 |
| 2015/0277587 A1* | 10/2015 | Chandran | G06F 3/0416 |
| | | | 345/173 |
| 2016/0004300 A1* | 1/2016 | Baic | G06F 3/011 |
| | | | 345/419 |
| 2016/0018885 A1* | 1/2016 | Kimura | G06F 3/011 |
| | | | 345/156 |
| 2016/0026253 A1* | 1/2016 | Bradski | G02B 27/225 |
| | | | 345/8 |
| 2016/0217617 A1* | 7/2016 | Barribeau | G06F 3/04815 |
| 2016/0247324 A1* | 8/2016 | Mullins | G06F 3/012 |
| 2016/0350971 A1* | 12/2016 | Athey | H04W 76/10 |
| 2017/0061692 A1* | 3/2017 | Giraldi | G06T 19/006 |
| 2017/0108838 A1* | 4/2017 | Todeschini | G05B 15/02 |
| 2017/0337744 A1* | 11/2017 | Martin | G01S 19/14 |
| 2018/0136465 A1* | 5/2018 | Chi | G02B 27/017 |
| 2018/0150971 A1* | 5/2018 | Adachi | G06K 9/00671 |
| 2018/0198789 A1* | 7/2018 | Liu | H04L 67/06 |

* cited by examiner

PROVIDING AUGMENTED REALITY LINKS TO STORED FILES

BACKGROUND

Aspects of the present invention relate to providing augmented reality links to stored files.

Augmented reality (AR) devices are known in the form of a mobile computing device having a camera, or wearable devices such as AR glasses, headsets, etc. AR devices have usability issues around how a user navigates around the screen, particularly with wearable devices since there is no mouse or touch screen. It is widely accepted that controlling the display is done with voice or gesture recognition.

Within AR devices, navigation through a file system is difficult and time consuming with either voice or gesture recognition as the user may need to keep moving up and down the file system to find the file the user is looking for. This is often a difficult task on a computer file system, particularly for people who do not remember where they saved something or fail to maintain a tidy file system. With navigation using voice or gestures, this is made significantly harder as an action is more time consuming and there is more room for error.

SUMMARY

Shortcomings of the prior art are overcome and additional advantages are provided through the provision of a computer-implemented method of providing augmented reality links to stored files. The computer-implemented method includes storing a marker of a real-world reference as viewed by an augmented reality (AR) device of a computer system, wherein the marker is stored in a database with a link to a location of a file system object of the computer system; and enabling saving and retrieval of the file system object to and from the computer system by user selection of the real-world reference via user interaction with the AR device thereby detecting the marker and activating the link to the computer system to save the file system object to the location or to retrieve the file system object from the location.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Association techniques are especially effective in helping people remember things. These techniques work by relating the thing that needs to be remembered with an object. Aspects of the described method and system provide file navigation by associating files with physical objects or places using an augmented reality (AR) device. The associations of files with physical objects or places aids with remembering where to find a certain file and providing an easier to use navigation technique for navigating a file system.

Aspects of the described method and system involve using a two-way pairing between the AR device and an associated computing system so that the AR device is able to move files around within the file system of the paired computing system.

In one aspect, a marker of a real-world reference (e.g., a real object or a real location) as viewed by an augmented reality (AR) device of a computer system is stored. The marker is stored in a database with a link to a location of a file system object (e.g., a file or a folder) in a file system of the computer system. Saving and retrieval of the file system object to and from the computer system are enabled by user selection of the real-world reference via user interaction with the AR device thereby detecting the marker and activating the link to the computer system to save the file system object to the location or to retrieve the file system object from the location.

Figure 1:
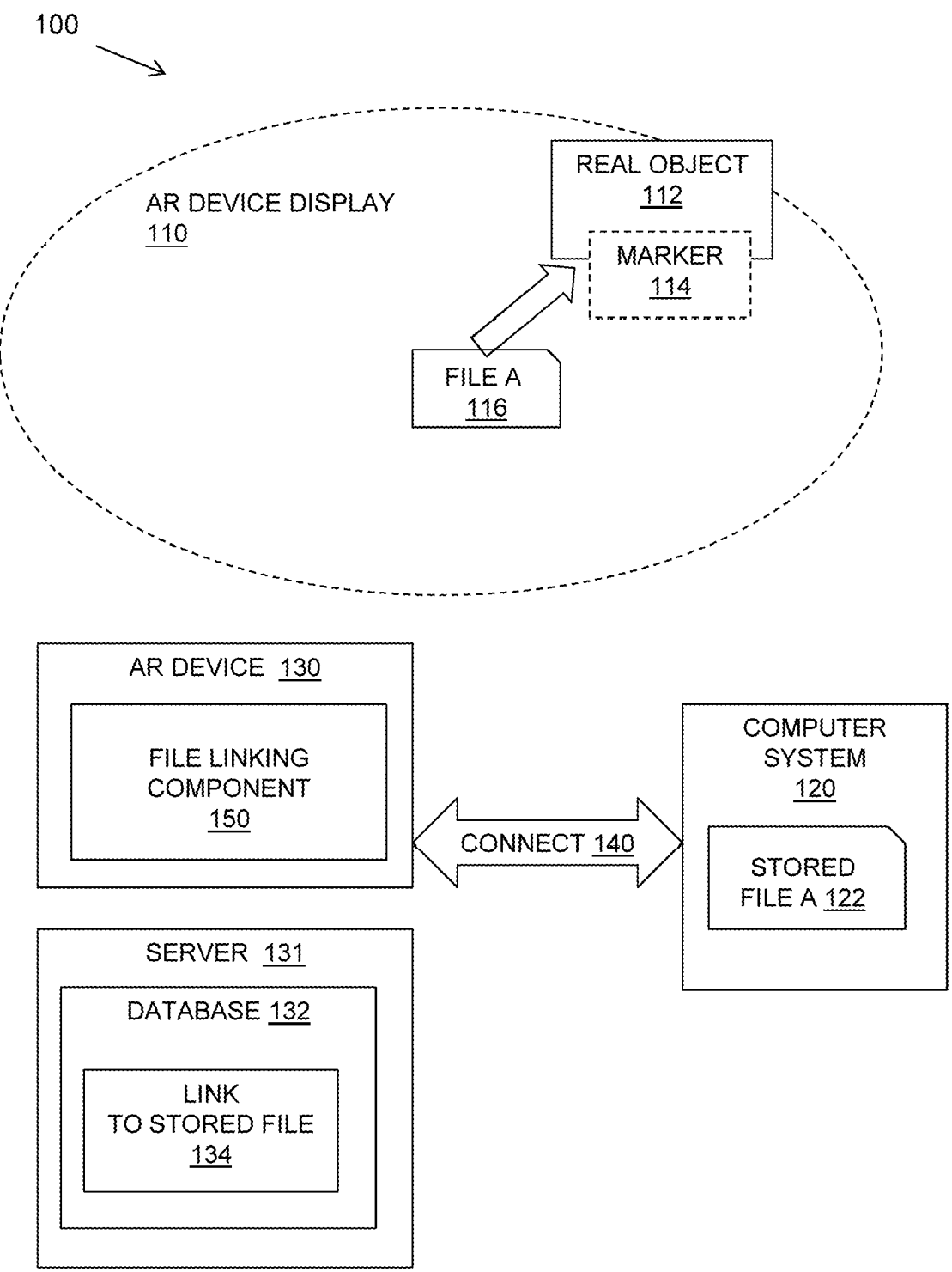
FIG. 1 is a schematic diagram illustrating a system in accordance with an example embodiment of the present invention.

Referring to FIG. 1, a schematic diagram 100 shows an example of the described system. An AR device 130 is provided which may be connected 140 to a computer system 120. The connection may be by pairing via a wireless communication, such as a short distance radio wave technology (e.g., Bluetooth), or Wi-Fi technology (e.g., Wi-Fi Direct). The AR device 130 may be connected 140 by communication with a remote computer system 120, such as a remote server. A remote communication may be via an Internet or other network connection.

The AR device 130 may be a mobile computing device, such as a smartphone or tablet having AR functionality including a camera, micro-electro-mechanical systems (MEMS) sensors, and a display. The camera may be used to view a scene to which AR functionality may be applied. The AR device 130 may alternatively be a wearable device, such as AR glasses, headsets or heads-up devices in which the AR functionality is provided by looking through a display.

The AR device 130 may have an AR device display 110 which may be, for example, a display on the device in the case of a mobile computing device, or a view through a viewer in the case of a wearable device.

Aspects of the described method and system enable a user to view a real object 112 and associate a stored file or folder 122 on a connected computer system 120 with the real object 112. The file or the folder 122 may be an individual computer file in a format capable of being opened by a computer application or a folder in the form of a group of files that may be of different formats, stored in a group in a reference folder. Most computer system operating systems provide a file system usually in the form of files stored in a hierarchy of folders that may be located via a file name. In aspects of the described method and system, an individual file 122 may be associated with the real object 112 or a folder in a location in a file system may be associated with the real object 112 with the folder including files and/or nested folders.

In one embodiment, an AR reference system may be used in which the real object's 112 form and/or location are used as a marker 114 and referenced to a link 134 stored in the database 132 of the AR device 130. In another embodiment, a superimposed symbol may be used to associate the real object 112 and used as a marker 114 with a link 134 stored in a database 132 of the AR device 130. The database 132 may be provided on a remote server 131 and accessed by the AR device 130 remotely; however, there may also be a local cache of the database 132 content.

Markers may be conventionally used in an AR system for retrieving information from a database and displaying the information as a superimposed overlay of information regarding the object or location to which the marker is referenced. Aspects of the described method and system provide an additional column in the marker database for storing a file location for retrieval in a connected computer system.

The AR device 130 is provided with a file linking component 150 which is described in further detail below with reference to FIG. 4. The file linking component 150 provides functionality for a user of the AR device 130 to set up links between real objects 112 and stored files 122 in the connected computer system 120. This may be done by providing a file icon 116 which may be dragged and dropped to the marker 114 or location of the real object 112. A gesture or action may be made by the user to indicate that the file icon 116 should be associated with the real object 112.

A link 134 in the form of an address string of a file or a folder on the computer system 120 may be added to the database 132, for example, this may be added to an existing database of overlay markers for the AR device 130. An additional file link column may be provided in the database 132 where overlays are stored to enable a marker to link to a specific file rather than just a static overlay.

A user may store additional files at the same location at the computer system 120 by using the AR device 130 to add a new file icon to the object. The additional file may be stored in the same folder as linked to the object.

A user may retrieve a stored file 122 from the location at the computer system 120 by reference to the real object 112 for display on the AR device 110 or on the connected computer system's 120 display. The retrieval may be carried out by using the AR device 130 to select the real object 112 by a gesture or action which may result in the file icon 116 being displayed for selection and opening.

This enables AR device 130 to associate certain real objects 112 in the user's vicinity (for example, a lamp or photograph frame) to a certain location in the connected computer system's file system. When a file icon 116 is dragged in the AR device display 110 to overlay the real object 112, the AR device 130 provides a link to the stored location.

By using an AR device 130, a user will be able to place visual links to files or folders as symbols on a physical object in their view. When the user then wishes to access this file or folder in their AR device 130, they can do so by touching or gesturing to the physical object in the real world.

The AR device 130 links the real object to a location in the file system and an icon of the corresponding file/folder may appear enabling it to be opened on the AR device or corresponding computer it is connected to.

In one embodiment, the file may be stored in a remotely connected computer system 120, such as a web server, and the file may be opened and displayed on the AR device or on a local computer system locally paired to the AR device.

An advantage of this system is that it makes it a lot easier to find and open files; particularly, when compared to using a tree structure of a computer file system. It is also a much simpler way of navigating within an AR device when compared with navigating the tree structure with voice commands or hand gestures.

The display of the opened file may be provided on the AR device display 110, the connected computer system 120 if local to the AR device, or a remote computer system with a browser display at a local device. A combination of the AR device and computer system may provide additional screen space and flexibility of location for viewing the file.

Figure 2:
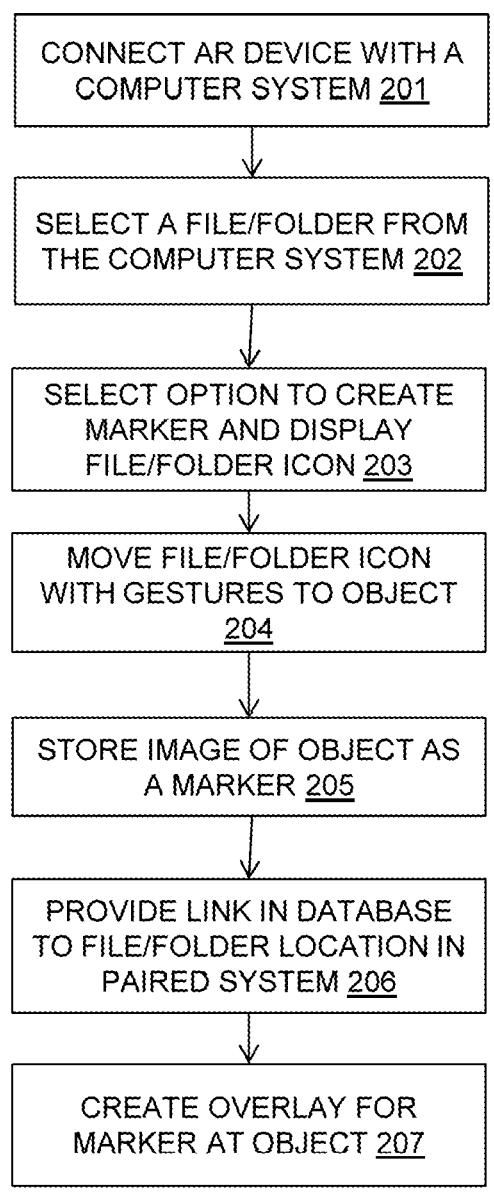
FIG. 2 is a flow diagram of an example embodiment of an aspect of a method in accordance with an aspect of the present invention.

Referring to FIG. 2, a flow diagram 200 shows an example embodiment of an aspect of the method of setting up the links between real objects or locations and stored files.

While the user is wearing or using an AR device, they may set up the links to the files or folders they wish to associate objects to.

The AR device may be connected or paired 201 to the computer system and a file or a folder may be selected 202 from a file storage location at the computing system. The files themselves are stored on the connected computer system and, by having the computer system paired with the AR device, the user may move these around.

An option may be selected 203 to link the file or the folder with a real object or location using the AR device and a file icon or other symbol may be displayed 203 on the AR device display to represent the file or folder.

On the computer system, the user may navigate in the operating system to the file or the folder that contains the file so the user can see the icon of the file. The user may look at the computer screen with the AR device and physically drag the file icon with a hand gesture in the AR view so a copy of the file icon as an overlay is moved beyond the computer screen and the user may place it on a real object or at a location.

The user may move 204 the file icon using known commands of the AR device, such as hand gestures or voice commands to locate the file icon over the real object or location in the AR device view and select that object or location for linking to the file or folder.

The AR device may store 205 an image of the object or the coordinate location as an AR marker.

Object recognition is used to detect an object and often uses additional data, such as GPS (Global Positioning System) coordinates to determine what the object is and see if it has a corresponding overlay. This makes the overlays dynamic. The AR device looks for a certain image (the marker) and this is either a simple code or pattern that is easily recognized or more complex image analysis and recognizing characteristics are to be used.

For example, if the object is a mug, the image of the mug may be stored as the marker. When a user looks at the mug, it does not have to be at the right angle and can look different, but the system knows whether or not it actually is the mug. This may be aided by determining the GPS coordinates of the AR device to determine if the mug is within a particular location.

With an accurate GPS location system, it may be possible to detect a location of the object extrapolated from the location of the AR device by direction and angle, which may be used for a marker without an object, for example, a location on a desk or office floor.

A marker is what AR devices use to look up an overlay that is applied to a certain object. This means that the next time the AR device sees that marker, which is actually just a physical object, it does a look up and returns an overlay, such as a file icon. If the object is moved, it may still be recognized as the marker by the AR system due to its recognized shape. Overlays have a corresponding link so that when the user appears to interact with the marker, an action is created which references a database to display information.

In an aspect of the described method, a link is provided 206 in a database associated with markers of the AR device, wherein the link is a file path or file name of the file in the connected computer system. The link is provided such that the AR device may read the link and know how to open the link in the operating system of the connected computer system.

In an embodiment in which the AR device is linking to files in a single connected computer system, the link may be the file path relative to that device, such as "C://Users/MyName/MyDocuments/MyFile.txt".

If however the files may be stored on more than one computer system, then the file string may have a reference to the computer system at the start of the string, which the AR device may interpret, e.g., "MyLaptop/C://Users/MyName/MyDocuments/MyFile.txt".

An overlay may be created 207 for the marker at the object including the link. This enables the AR device to recognize the real object or location and retrieve the marker including the file link as described further in relation to FIG. 3A.

Figure 3A:
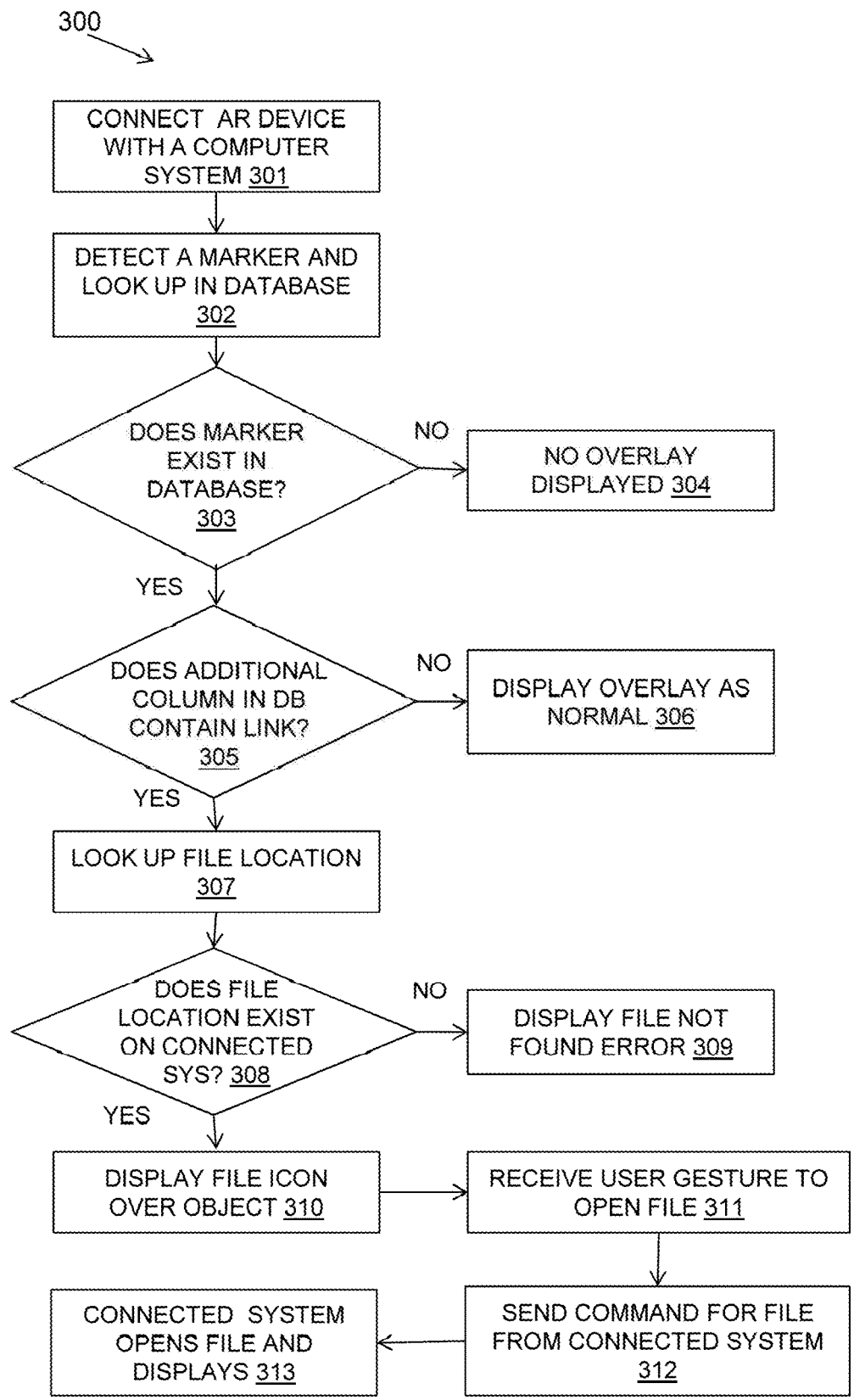
FIGS. 3A and 3B are flow diagrams of example embodiments of further aspects of a method in accordance with an aspect of the present invention.

Referring to FIG. 3A, a flow diagram 300 shows an example embodiment of an aspect of the method of retrieving links between real objects or locations and stored files or folders. In this example, a file is retrieved; however, a folder may be retrieved and a subsequent action may open the folder and retrieve a selected file.

An AR device may be connected 301 with a computer system. In some embodiments, the connection may only take place once a file link is retrieved, as described below.

The AR device is used to detect 302 a marker and look up the marker in a database. The detection of the marker may be directed by the user of the AR device. For example, a user may remember that the user stored an important document by reference to the user's desk lamp object; the user may point the AR device at the desk lamp that recognizes the stored desk lamp marker by shape and/or location of the desk lamp.

It may be determined 303 if the marker exists in the database. If it does not exist, no overlay is displayed 304. However, if it does exist, it is determined 305 if there is an additional column in the database of markers containing a link. If the object exists as a marker, in addition to looking up overlays for the marker, it will also check if a file exists for that object.

If there is no link, then the overlay may be displayed 306 as normal, for example with an image or information regarding the object. However, if there is a link, the method may look up 307 the file location given in the link. This may involve connecting to a referenced computer system, if the AR device is not already connected or paired to a computer system.

In a case, where files may be stored in more than one computer system, the link may be required in order to know which computer system with which to connect to retrieve the file.

It may be determined 308 if the file location exists on the connected system. If the file does not exist, an error may be displayed 309 that the file has not been found. If the file does exist at the location, a file icon may be displayed 310 over the real object. When the user issues a command received 311 by the AR device, such as a specific hand gesture relating to the object, the AR device may send 312 a command for the file from the connected system.

In the embodiment in which the AR device is linking to files in a single connected computer system, the link may be the file path relative to that device, such as "C://Users/MyName/MyDocuments/MyFile.txt". If the AR device wishes to open that file, then it requests opening it and the operating system of the connected computer system knows what default program in which to open files of that file extension (".txt").

If the files may be stored on more than one computer system, then the file string may have a reference to the computer system at the start of the string, which the AR device may interpret, such as "MyLaptop/C://Users/MyName/MyDocuments/MyFile.txt". The AR device then determines which paired computer system the file is on from the first section of the string and then use the remainder of the string as the file location.

The connected system may then open 313 the file and display the file either on the AR device's display or the connected system's display. The file may be able to be moved between the displays by a further gesture.

Using aspects of the described method and system, the user may sit at their computer as usual and, instead of having to navigate through their file system on their desktop, they can touch a physical object on their desk and the AR device would convert this into the relevant file link and open the document.

The user may place links to important files in certain places around their home or a regular environment. For example, a user may wish to place a link to their home insurance documents in their bedside drawer. The document is actually stored in a file system on their computer system or remotely at a web server location. When the user wishes to view the insurance document, they walk over to the bedside drawer and make some gesture to it, such as touching the handle. The AR device would then associate that with a link to the document and open it from the computer system on the headset or on a computer system's display.

A benefit of aspects of this method and system is that a user may associate their most common file or folder digital locations to the physical objects around them for easier access and to help them to find them. This means that a physical desktop may act as a computer's "Desktop", a picture on the wall in front of the desk may be a link to take the user to your "My Pictures" folder, and so on.

Figure 3B:
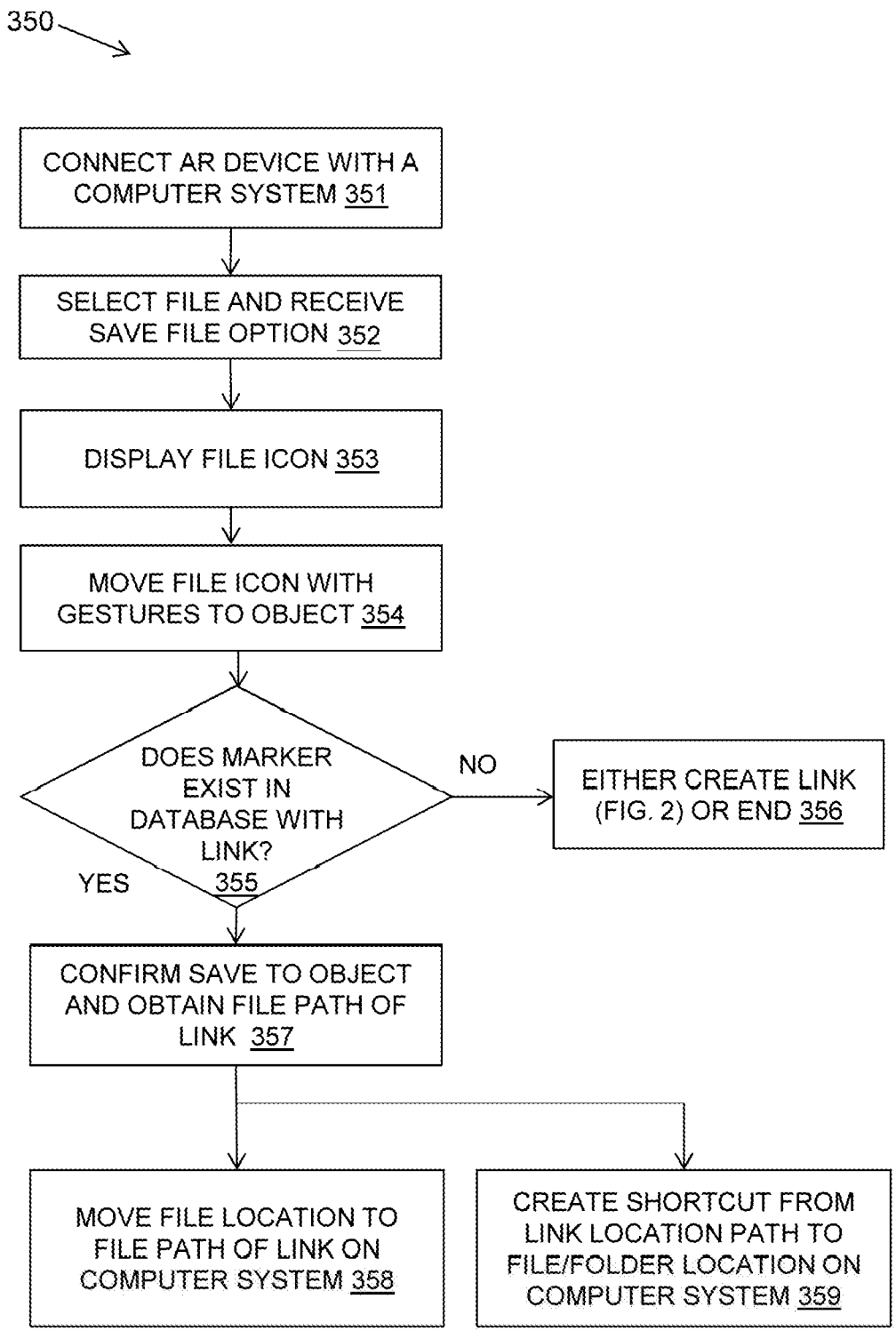

Referring to FIG. 3B, a flow diagram 350 shows an example embodiment of an aspect of the method of retrieving links between real objects or locations and stored files or folders. In this example, a file is saved in a folder linked to the object; however, a folder may be saved within another folder linked to the object.

An AR device may be connected 351 with a computer system. In some embodiments, the connection may only take place once a file link is retrieved, as described below.

A file may be selected 352 and the AR device may receive a save option for the file by the user interacting with the AR device. This may be a file local to the AR device or accessed by the AR device, for example, from a remote server, or it may be a file local to a connected computer system.

The AR device may display 353 a file icon that may be moved 354 by the user interaction with the AR device to a real object or location in the AR display. This is similar to moving a file icon as described in relation to FIG. 2 as carried out when setting up an associated object.

It may be determined 355 if a marker exists for the object or location with a file path link in the marker database. If not, then the method may end 356 or a new association may be created following the method of FIG. 2.

If a marker exists with a file path link in the marker database, a confirmation may be received 357 to save the file to the object or location and the file path link may be obtained from the database.

In one embodiment, the file may be moved 358 from its current location, which may be a temporary cache, to the file system location in the connected computer system as provided by the file path link.

In another embodiment, a shortcut may be created 359 from the folder in the file path of the link to the file's current location in order to open the file via the associated link.

An example use case is given as follows. Bob is working on his desktop computer for his job, which is paired to his AR glasses. He uses his AR glasses to display social media feeds off screen so that he is kept up to date without having to keep switching windows on his physical monitor. A friend sends Bob a picture on a social media site that he likes and wants to save. Using hand movements in the physical space, Bob drags the virtual image shown on his AR glasses onto a physical photograph that he has pinned on a corkboard above his desk. This physical photograph has previously been assigned to represent the "My Pictures" folder on Bob's desktop computer. The AR device then stores this image into that folder on Bob's desktop computer.

Figure 4:
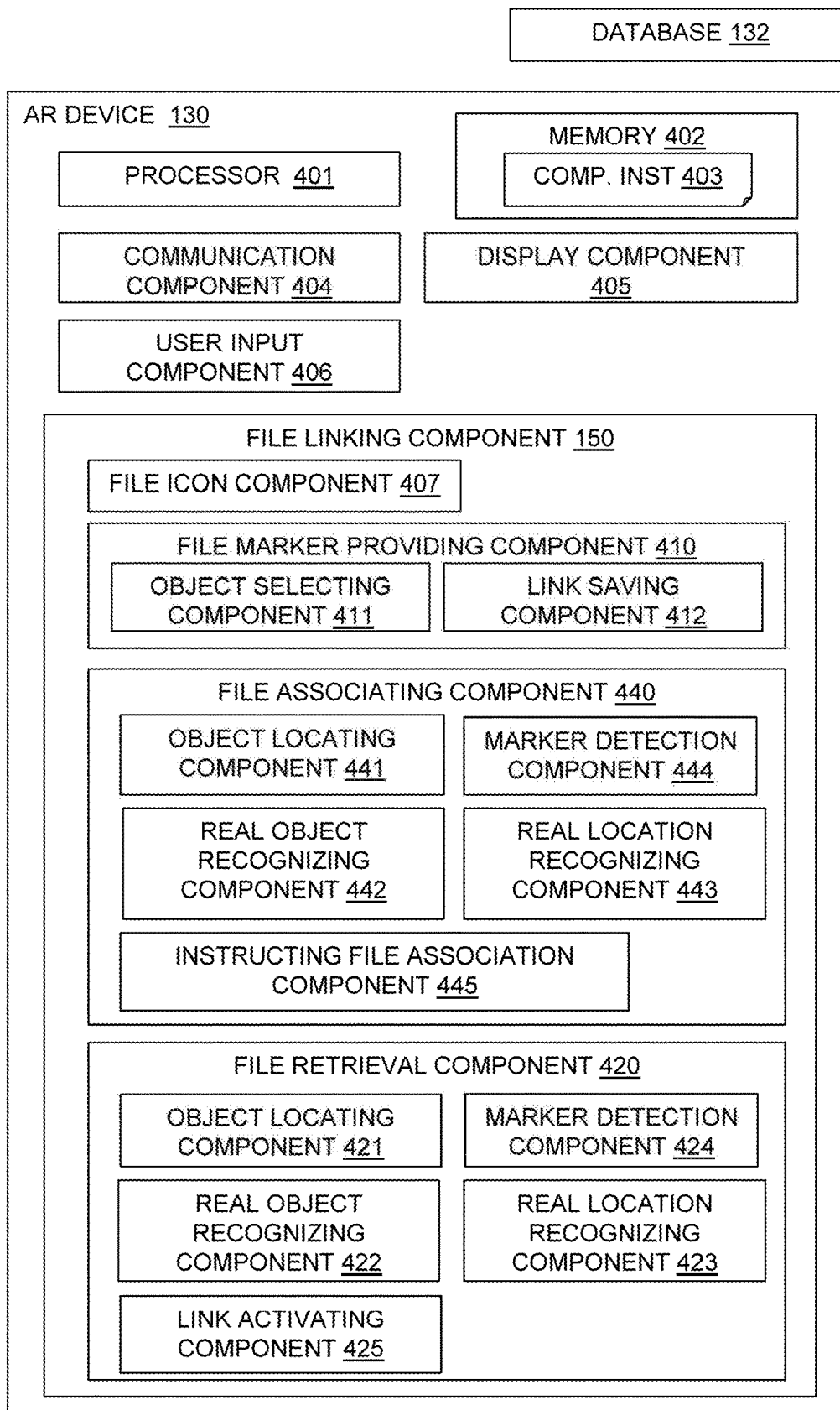
FIG. 4 is block diagram of an example embodiment of a system in accordance with an aspect of the present invention.

Referring to FIG. 4, a block diagram 400 shows an AR device 130 with a file linking component 150.

The AR device 130 includes at least one processor 401, a hardware module, or a circuit for executing the functions of the described components which may be software units executing on the at least one processor. Multiple processors running parallel processing threads may be provided enabling parallel processing of some or all of the functions of the components. Memory 402 may be configured to provide computer instructions 403 to the at least one processor 401 to carry out the functionality of the components.

The AR device 130 is connectable to a computer system at which a file or a folder is stored in a file system. The AR device may have a communication component 404 for connection to a local computer system via a wireless communication, such as Bluetooth or Wi-Fi or to a remote computer system via the Internet or a network communication. The AR device 130 may be connectable to multiple computer systems for retrieval of files or folders from each of the computer systems.

The AR device 130 may include a display component 405 for displaying an AR environment and a user input component 406 that may enable user input via voice, hand gestures or other means.

The AR device 130 may include a file linking component 150 including a file icon component 407 for providing an icon for display in the AR device 130 display representing the file or the folder in the computer system to be referenced by the link. The file icon component 407 may enable moving the icon to overlay a real object or a real location viewed using the AR device 130.

The file linking component 150 may include a file marker providing component 410 for storing a marker of a real object or a real location as viewed by the AR device 130. Markers are stored in a database 132 of the AR device 130 with a link to a location of a file or a folder in the file system of the connectable computer system.

The file marker providing component 410 may include an object selecting component 411 for selecting a real object or location as having a marker for association with files and/or folders. The file marker providing component 410 may also include a link saving component 412 for inputting a command to save a link to the file or the folder in the database 132 of markers for the object or location.

The file linking component 150 may include a file associating component 440 for enabling saving of a file or a folder to a folder on the connectable computer system by user selection of the real object or the real location via user interaction with the AR device 130.

The file linking component 150 may include a file retrieval component 420 for enabling the retrieval of a file or a folder from the connectable computer system by user selection of the real object or the real location via user interaction with the AR device 130.

The file associating component 440 and file retrieval component 420 may both include an object locating component 441, 421 for locating and selecting an object by user interaction with the AR device and a marker detecting component 444, 424 for detecting a marker for a selected object or location and looking up the database 132 of markers to determine if a link is provided for the marker.

The file associating component 440 and file retrieval component 420 may include: a real object recognizing component 442, 422 for recognizing a real object by viewing an environment via the AR device 130 and matching a shape of a marker to the shape of the real object and/or a real location recognizing component 443, 423 for recognizing a real location by viewing an environment via the AR device 130 and matching coordinates of a real location to coordinates referenced in a marker.

The file associating component 440 may include an instructing file association component 445 for instructing a computer system to move a file or a folder to a file system location as provided by the file path link of the object or location. In this way, a file or a folder may be moved to a file system folder associated with the real object or real location.

The file retrieval component 420 may include a link activating component 425 for activating a link to the computer system to retrieve the file or folder. The link activating component 425 enables retrieval of the file or the folder by reading the file path link and opening the link in the operating system of the computer system.

The file associating component 440 and the file retrieval component 420 may include activating the communication component 404 when a file path link is to be to a computer system which is currently offline by reference to the computer system in the link.

The display component 405 of the AR device 130 may be used for displaying the retrieved file or folder in an AR device display or in a display of a connected computer system.

Figure 5:
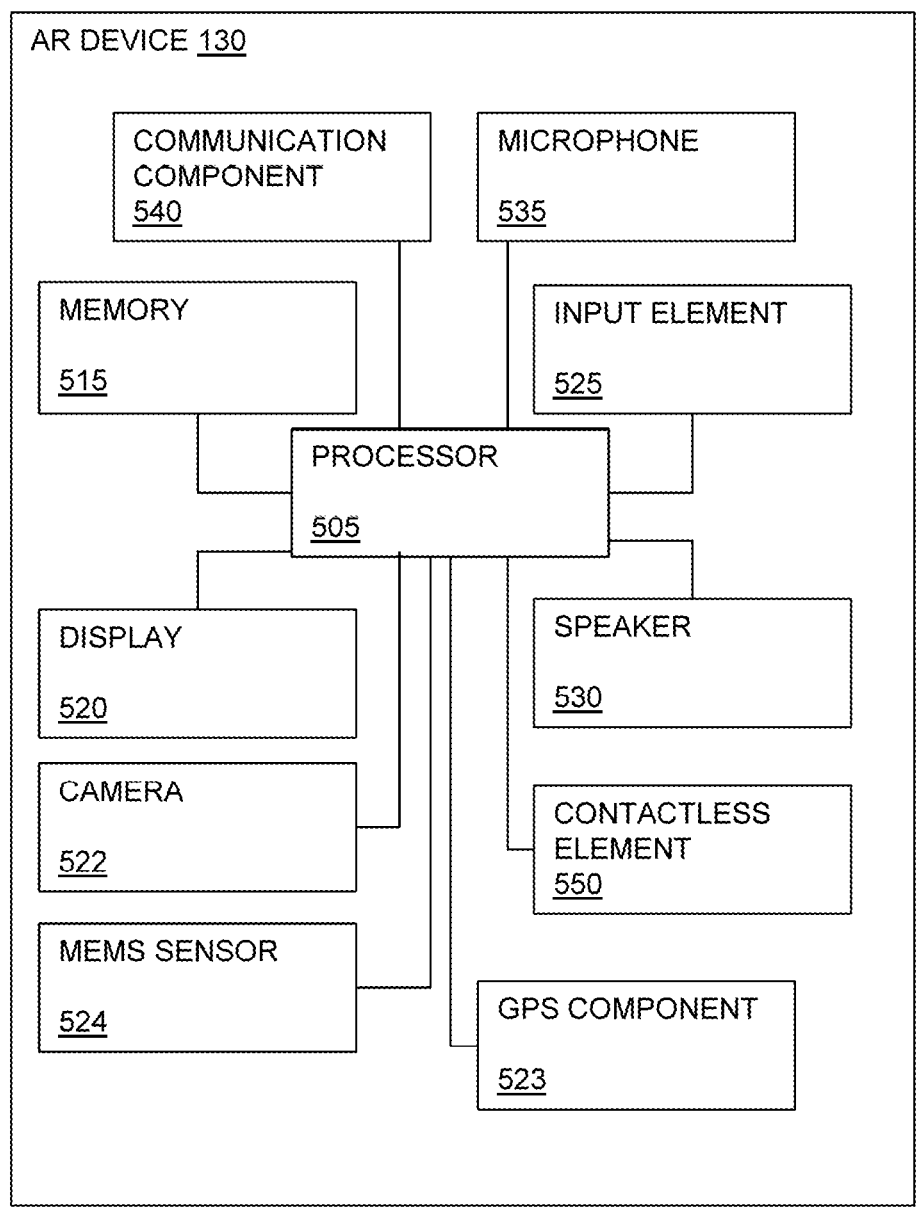
FIG. 5 is a block diagram of an augmented reality device in which aspects of the present invention may be implemented.

FIG. 5 shows a block diagram of an AR device 130 that may be used in embodiments of the disclosure. The AR device 130 may be a handheld communication device, such as a mobile phone or tablet, or may be a wearable device such as AR glasses or headsets.

The AR device 130 may include a processor 505 (e.g., a microprocessor) for processing the functions of the AR device 130 and a display 520 to allow a user to see AR information superimposed on a direct view or a view via a camera of the AR device 130. The AR device 130 may include a camera 522 and MEMS sensors 524 for location and movement sensing of the device. The AR device 130 may also include a global positioning system (GPS) component 523.

The AR device 130 may further include an input element 525 to allow a user to input information into the device (e.g., via voice input, gesture recognition, touch screen, etc.), a speaker 530 to allow the user to hear voice communication, music, etc., and a microphone 535 to allow the user to transmit his or her voice through the AR device 130.

The processor 505 of the AR device 130 may connect to a memory 515. The memory 515 may be in the form of a computer-readable medium that stores data and computer-executable instructions.

The AR device 130 may also include a communication component 540 for connection to communication channels (e.g., a cellular telephone network, data transmission network, Wi-Fi network, satellite-phone network, Internet network, Satellite Internet Network, etc.). The communication component 540 may include an associated wireless transfer element, such as an antenna.

The communication component 540 may include a subscriber identity module (SIM) in the form of an integrated circuit that stores an international mobile subscriber identity and the related key used to identify and authenticate a subscriber using the AR device 130.

The AR device 130 may further include a contactless element 550, which is typically implemented in the form of a semiconductor chip (or other data storage element) with an associated wireless transfer element, such as an antenna. The contactless element 550 may be associated with (e.g., embedded within) the AR device 130 and data or control instructions transmitted via a cellular network may be applied to the contactless element 550 by means of a contactless element interface (not shown). The contactless element interface may function to permit the exchange of data and/or control instructions between mobile device circuitry (and hence the cellular network) and the contactless element 550.

The contactless element 550 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the AR device 130 and an interrogation device. Thus, the AR device 130 may be capable of communicating and transferring data and/or control instructions via both a cellular network and near field communications capability.

Figure 6:
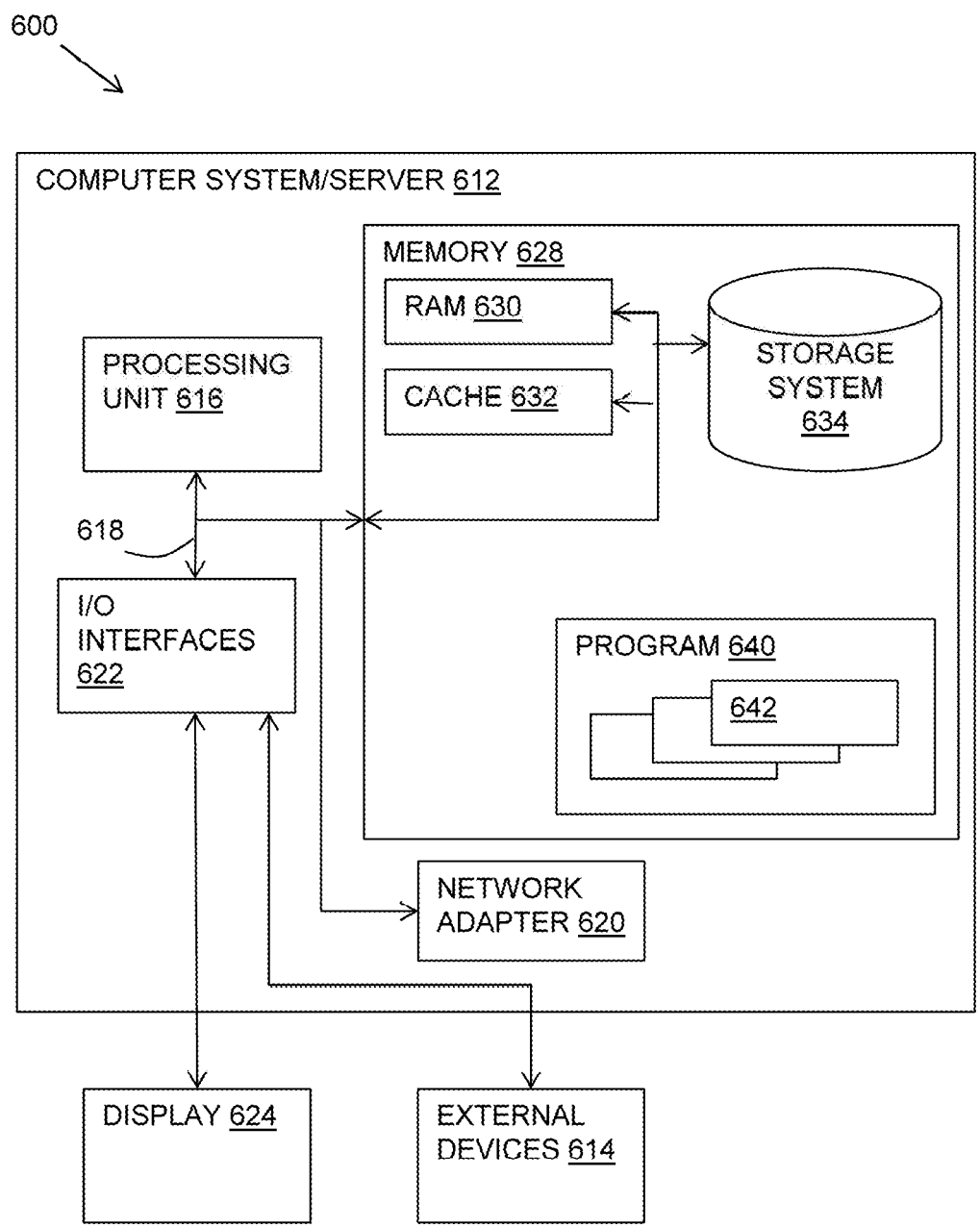
FIG. 6 is a block diagram of an embodiment of a computer system in which aspects of the present invention may be implemented.

Referring now to FIG. 6, a schematic of an example of a system 600 in the form of a computer system or server is shown.

A computer system or server 612 may be operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system or server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

In FIG. 6, a computer system/server 612 is shown in the form of a general-purpose computing device. The components of the computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

As described herein, according to one aspect of the present invention, there is provided a computer-implemented method of providing augmented reality links to stored files carried out at an augmented reality (AR) device connectable to a computer system, said computer-implemented method comprising: storing a marker of one of a real object or a real location as viewed by the AR device, wherein the marker is stored in a database with a link to a location of one of a file or a folder in a file system of the connectable computer system; and enabling saving and retrieval of a file or a folder to and from the connectable computer system by user selection of the real object or the real location via user interaction with the AR device thereby detecting the marker and activating the link to the computer system to save a file or a folder to the location or to retrieve a file or a folder from the location.

According to another aspect of the present invention, there is provided a system for providing augmented reality links to stored files comprising an augmented reality (AR) device connectable to a computer system at which a file or a folder is stored in a file system, the AR device comprising: a processor and a memory configured to provide computer program instructions to the processor to execute the function of the components; a file marker providing component a marker of a real object or a real location as viewed by the AR device, wherein the marker is stored in a database with a link to a location of a file or a folder in the file system of the connectable computer system; a file associating component for enabling saving of a file or a folder to the connectable computer system by user selection of the real object or the real location via user interaction with the AR device thereby detecting the marker and activating the link to the computer system to save a file or a folder to the location; and a file retrieval component for enabling the retrieval of a file or a folder from the connectable computer system by user selection of the real object or the real location via user interaction with the AR device thereby detecting the marker and activating the link to the computer system to retrieve a file or a folder from the location.

According to a further aspect of the present invention, there is provided a computer program product for providing augmented reality links to stored files carried out at an augmented reality (AR) device connectable to a computer system at which a file or a folder is stored in a file system, the computer program product comprising a computer readable storage medium having program instructions embodied therewith, the program instructions executable by a processor to cause the processor to: store a marker of a real object or a real location as viewed by the AR device, wherein the marker is stored in a database with a link to a location of a file or a folder in the file system of the connectable computer system; and enable saving and retrieval of a file or a folder to and from the connectable computer system by user selection of the real object or the real location via user interaction with the AR device thereby detecting the marker and activating the link to the computer system to save a file or a folder to the location or to retrieve a file or a folder from the location.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of aspects of the present invention.

What is claimed is:

1. A method of providing augmented reality links to stored files, said method comprising:
    facilitating, via an augmented reality (AR) device, navigation in a computer system, the facilitating comprising:
        creating a link to a file system object, the creating being based, in part, on a user viewing through the AR device a computer screen of a computer system while a file system object is being displayed by the computer screen, the AR device being coupled to the computer system using a two-way pairing, and the creating comprising:
            displaying, on the AR device, an option to be selected by the user, the option enabling the user to create a marker of a real-world reference, the creating the marker causing an image, as seen through the AR device, to be superimposed onto the real-world reference, the marker being stored in a database of the computer system, the marker comprising a characteristic of the real-world reference;
            based on the user selecting the option, displaying, on the AR device, a virtual icon representing the file system object being displayed by the computer screen, the virtual icon being overlaid, as seen through the AR device, on top of the computer screen, the virtual icon being linked to the file system object of the computer system; and
            recognizing, by the AR device, a command made of user, the command causing the virtual icon to be moved from where it is overlaid over the computer screen to beyond the computer screen and dropped onto the image superimposed onto the real-world reference, the dropping causing the link to the file system object to be created.

2. The method as claimed in claim 1, wherein the link between the file system object and the marker, is stored in the database in a form of a file path to the location of the file system object in the computer system.

3. The method as claimed in claim 1, wherein the creating further comprises recognizing, based on the virtual icon being dropped onto the image superimposed on the real-world reference, the marker of the real-world reference and looking up the database to determine whether the link is provided for the marker.

4. The method as claimed in claim 1, wherein the facilitating further comprises:
    retrieving, via the AR device, content of the file system object based on the link created, the retrieving comprising:
        detecting, by the AR device, that the marker exists in the database, the detecting being based on recognizing a user movement, the user movement causing the AR device to compare characteristics of the real-world reference to the marker and, based on the characteristics of the marker matching the real-world reference, enabling the user to open the file system object via the AR device; and
        opening, via the AR device, the file system object on at least one of the AR device or the computer screen, the opening being based on the virtual icon appearing, based on the detecting, and the user selecting the virtual icon, the selecting activating the link to the file system object.

5. The method as claimed in claim 4, wherein the opening the file system object includes connecting to the computer system via the two-way pairing based on a reference to the computer system in the link.

6. The method as claimed in claim 1, wherein the characteristic of the real-world reference includes a shape of the real-world reference.

7. The method as claimed in claim 1, wherein the characteristic of the real-world reference includes a real location based on coordinates referenced in the marker.

8. The method as claimed in claim 1, wherein the command includes a user action, the user action being selected from the group consisting of a gesture of the user, and a voice command of the user.

9. The method as claimed in claim 1, wherein the file system object comprises an object selected from the group consisting of an individual computer file in a format capable of being opened by a computer application, and a folder in the form of a group of files.

10. A system for providing augmented reality links to stored files, said system comprising:
    a memory; and
    a processor in communication with the memory, wherein the system is configured to perform a method, said method comprising:
        facilitating, via an augmented reality (AR) device, navigation in a computer system, the facilitating comprising:
            creating a link to a file system object, the creating being based, in part, on a user viewing through the AR device a computer screen of a computer system while a file system object is being displayed by the computer screen, the AR device being coupled to the computer system using a two-way pairing, and the creating comprising:
                displaying, on the AR device, an option to be selected by the user, the option enabling the user to create a marker of a real-world reference, the creating the marker causing an image, as seen through the AR device, to be superimposed onto the real-world reference, the marker being stored storing, in a database of the computer system, the marker comprising a characteristic of the real-world reference;
                based on the user selecting the option, displaying, on the AR device, a virtual icon representing the file system object being displayed by the computer screen, the virtual icon being overlaid, as seen through the AR device, on top of the computer screen, the virtual icon being linked to the file system object of the computer system; and
                recognizing, by the AR device, a command of the user, the command causing the virtual icon to be moved from where it is overlaid over the computer screen to beyond the computer screen and dropped onto the image superimposed onto the real-world reference, the dropping causing the link to the file system object to be created.

11. The system as claimed in claim 10, wherein the link between the file system object and the marker, is stored in the database, and the link is saved in the database in a form of a file path to the location of the file system object in the computer system.

12. The system as claimed in claim 10, wherein the creating further comprises recognizing, based on the virtual icon being dropped onto the image superimposed on the real-world reference, the marker of the real-world reference and looking up the database to determine whether the link is provided for the marker.

13. The system as claimed in claim 10, wherein the characteristic of the real-world reference includes at least one of: a shape of the real-world reference, and a real location based on coordinates referenced in the marker.

14. The system as claimed in claim 10, wherein the facilitating further comprises:
    retrieving, via the AR device, content of the file system object based on the link created, the retrieving comprising:
        detecting, by the AR device, that the marker exists in the database, the detecting being based on recognizing a user movement, the user movement causing the AR device to compare characteristics of the real-world reference to the marker and, based on the characteristics of the marker matching the real-world reference, enabling the user to open the file system object via the AR device; and
        opening, via the AR device, the file system object on at least one of the AR device or the computer screen, the opening being based on the virtual icon appearing, based on the detecting, and the user selecting the virtual icon, the selecting activating the link to the file system object.

15. A computer program product for providing augmented reality links to stored files, said computer program product comprising:
    a computer readable storage medium readable by a processing circuit and storing instructions for execution by the processing circuit for performing a method comprising:

facilitating, via an augmented reality (AR) device, navigation in a computer system, the facilitating comprising:
  creating a link to a file system object, the creating being based, in part, on a user viewing through the AR device a computer screen of a computer system while a file system object is being displayed by the computer screen, the AR device being coupled to the computer system using a two-way pairing, and the creating comprising:
    displaying, on the AR device, an option to be selected by the user, the option enabling the user to create a marker of a real-world reference, the creating the marker causing an image, as seen through the AR device, to be superimposed onto the real-world reference, the marker being stored in a database of the computer system, the marker comprising a characteristic of the real-world reference;
    based on the user selecting the option, displaying, on the AR device, a virtual icon representing the file system object being displayed by the computer screen, the virtual icon being overlaid, as seen through the AR device, on top of the computer screen, the virtual icon being linked to the file system object of the computer system; and
    recognizing, by the AR device, a command of the user, the command causing the virtual icon to be moved from where it is overlaid over the computer screen to beyond the computer screen and dropped onto the image superimposed onto the real-world reference, the dropping causing the link to the file system object to be created.

16. The computer program product as claimed in claim 15, wherein the link between the file system object and the marker is stored in the database, and the link is saved in the database in a form of a file path to the location of the file system object in the computer system.

17. The computer program product as claimed in claim 15, wherein the creating further comprises recognizing, based on the virtual icon being dropped onto the image superimposed on the real-world reference, the marker of the real-world reference and looking up the database to identify the link is provided for the marker.

18. The computer program product as claimed in claim 15, wherein the characteristic of the real-world reference includes at least one of: a shape of the real-world reference, and a real location based on coordinates referenced in the marker.

19. The computer program product as claimed in claim 15, wherein the facilitating further comprises:
  retrieving, via the AR device, content of the file system object based on the link created, the retrieving comprising:
    detecting, by the AR device, that the marker exists in the database, the detecting being based on recognizing a user movement, the user movement causing the AR device to compare characteristics of the real-world reference to the marker and, based on the characteristics of the marker matching the real-world reference, enabling the user to open the file system object via the AR device; and
    opening, via the AR device, the file system object on at least one of the AR device or the computer screen, the opening being based on the virtual icon appearing, based on the detecting, and the user selecting the virtual icon, the selecting activating the link to the file system object.

* * * * *